United States Patent

[11] 3,552,663

[72] Inventor John Royals
21 E. Seminary Ave., Lutherville, Md. 21093
[21] Appl. No. 781,550
[22] Filed Dec. 5, 1968
[45] Patented Jan. 5, 1971

[54] ICE SHAVING MACHINE
9 Claims, 10 Drawing Figs.
[52] U.S. Cl. .................................................. 241/92, 241/257
[51] Int. Cl. ............................................... B02c 18/12
[50] Field of Search ................................. 241/91, 92, 46.1, 188, 257, (Ice Digest)(REIM Digest); 146/108, 114, 124

[56] References Cited
UNITED STATES PATENTS
2,033,903 3/1936 Smith .......................... 241/92
2,181,000 11/1939 Shively ......................... 241/92
2,665,852 1/1954 Shively ......................... 241/257X
2,684,207 7/1954 O'Brien ........................ 241/92
3,051,401 8/1962 Huck ............................ 241/257

Primary Examiner—Theron E. Condon
Assistant Examiner—Robert L. Spruill
Attorney—Pierce, Scheffler and Parker ABSTRACT: A machine for producing shaved ice for use in making ice confections comprises an upright housing which includes a thermally insulated chamber for storing ice in chunk form, and a motor driven rotor located at the lower part of the chamber that includes blades on the upper face thereof which shave the ice and deliver it through a slot into a chamber from which it is ejected by centrifugal force into a discharge outlet. The rotor is removably attached to the motor shaft by fastening means accessible from the interior of the ice chamber so as to permit the rotor to be easily removed for cleaning of the rotor as well as the interior of the ice chamber.

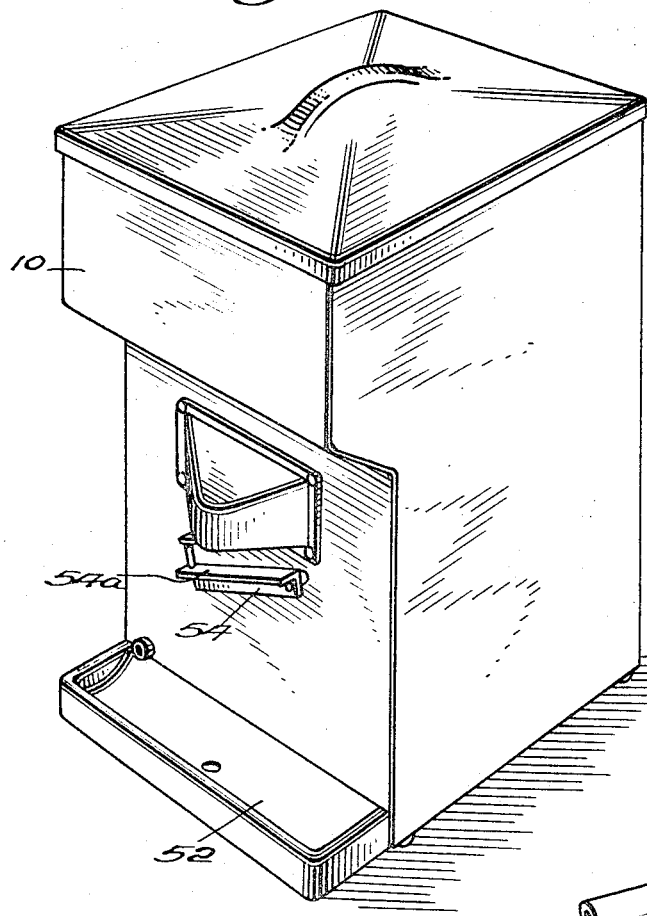
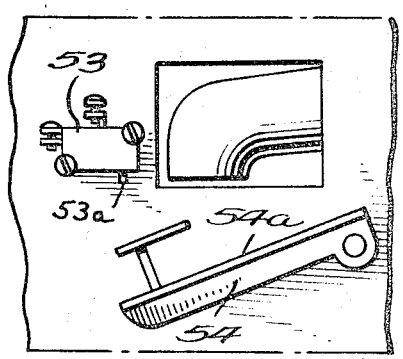
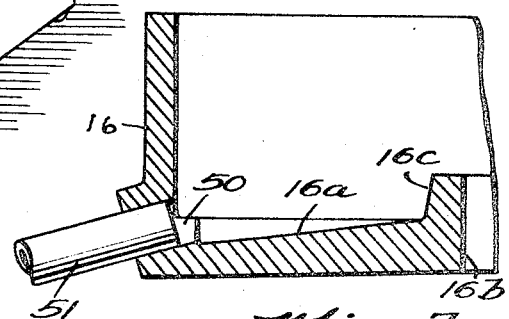
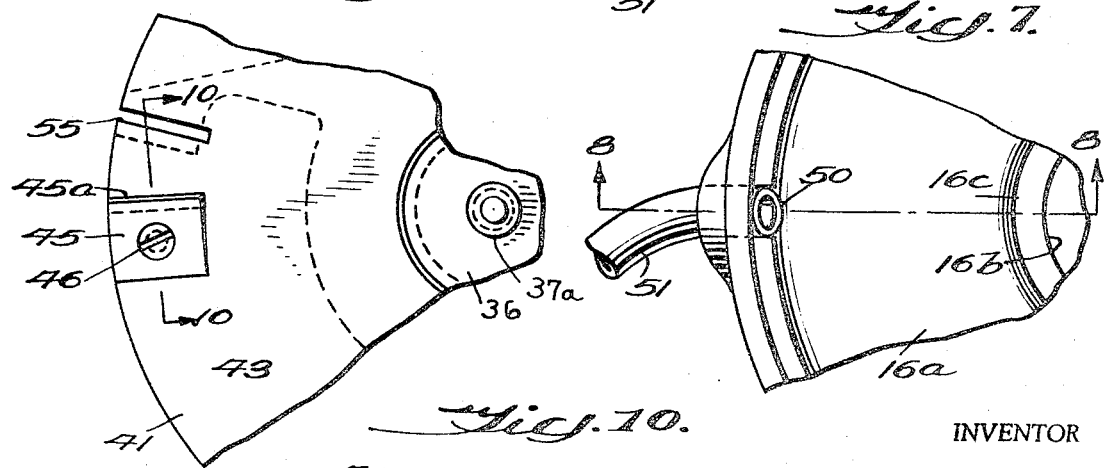

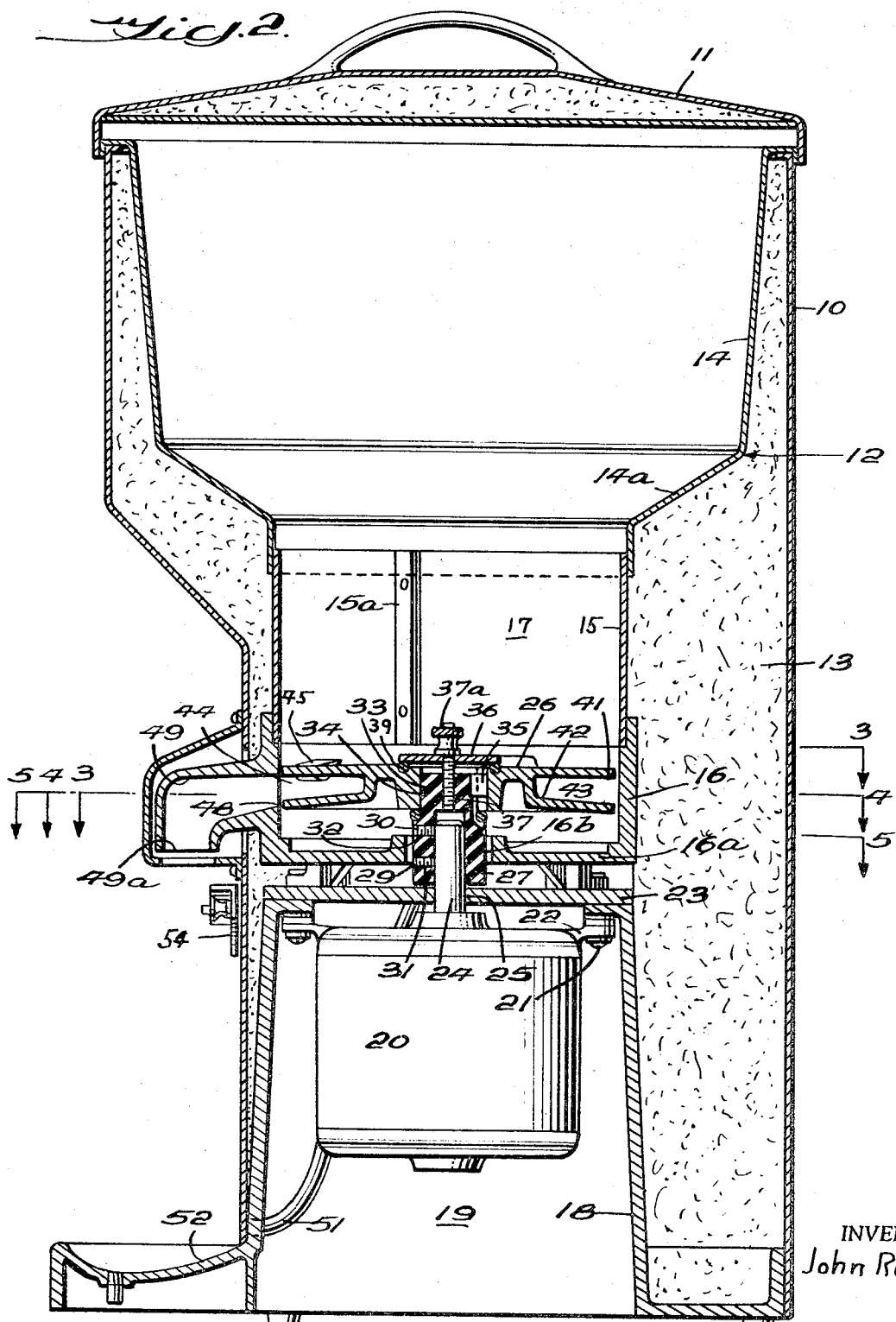

PATENTED JAN 5 1971

INVENTOR
John Royals

BY Pierce, Schiffler & Parker
ATTORNEYS

ICE SHAVING MACHINE

The present invention relates to machines which produce finely shaved ice from chunks of ice, the shaved ice being used in the production of confections comprised of the ice and a flavoring syrup.

Machines of this type have been known for some time and consist essentially of an insulated housing providing a vertically disposed chamber and at the bottom of which is located a motor driven rotor carrying one or move shaving blades. Ice in shaved form is then discharged from the chamber through a discharge spout into a confection cone or other suitable container in which the syrup flavored confection is to be formed. A typical known construction is disclosed in U.S. Pat. No. 1,992,783 issued in the name of Ralston R. Smith.

An object of the present invention is to provide an improved construction which permits the ice shaving rotor to be easily removed from its chamber thus making it more easy to clean the rotor and the chamber in which it operates.

Another object is to provide an improved connection between the rotor and the drive shaft of the motor which has an inherent insulating characteristic. Since the rotor temperature is comparatively low due to its contact with the ice, the insulative character of the connection retards a flow of "cold" to the motor casing and shaft which otherwise might result in undesirable condensation on the motor.

Yet another object is to provide an improved contour for the floor of the ice chamber below the rotor where a water drain is located, the floor being sloped toward the drain but the low point of the floor being slightly offset from the location of the drain hole itself in order to avoid accumulation of mineral scale at the hole itself which might otherwise clog the drain.

Still another object is to provide an improved construction for the ice shaver rotor itself. The rotor is disconnected from the motor shaft at a point within the chamber and is provided with at least one and preferably two diametrically opposed radial slots which enable the rotor to be lifted out of its chamber after it has been disconnected from the motor shaft, these slots making it possible for the rotor to move past the radial fin or baffle which is provided in the chamber to prevent the chunks of ice from rotating therein during operation. Also, the upper and lower walls of the rotor which are spaced from each other to define a shaved ice receiving groovelike chamber, and from which the shaved ice is thrown due to centrifugal action into the outlet spout are so constructed that the groove enlarges in a radially outward direction to minimize the chances for clogging and also to prevent water from standing on the surfaces of the rotor.

Still another object is to provide an improved outlet spout for the shaved ice, the outlet increasing progressively in cross section toward the discharge end which facilitates discharge of the shaved ice and prevents clogging.

The foregoing as well as other objects and advantages inherent in the invention will become more apparent from the following detailed description of one suitable embodiment and the accompanying drawings wherein:

FIG. 1 is a view of the ice shaving machine in perspective;

FIG. 2 is a view of the machine as seen in central vertical section;

FIG. 6 is a detail showing the switching actuating mechanism for starting the machine;

FIG. 7 is a detail showing a portion of the bottom wall of the compartment in which the ice shaver rotor is located;

FIG. 8 is a section on line 8—8 of FIG. 7;

FIG. 9 is a detail showing a portion of the ice shaver rotor in top plan; and

FIG. 10 is a section on line 10—10 of FIG. 9.

Figure 3:
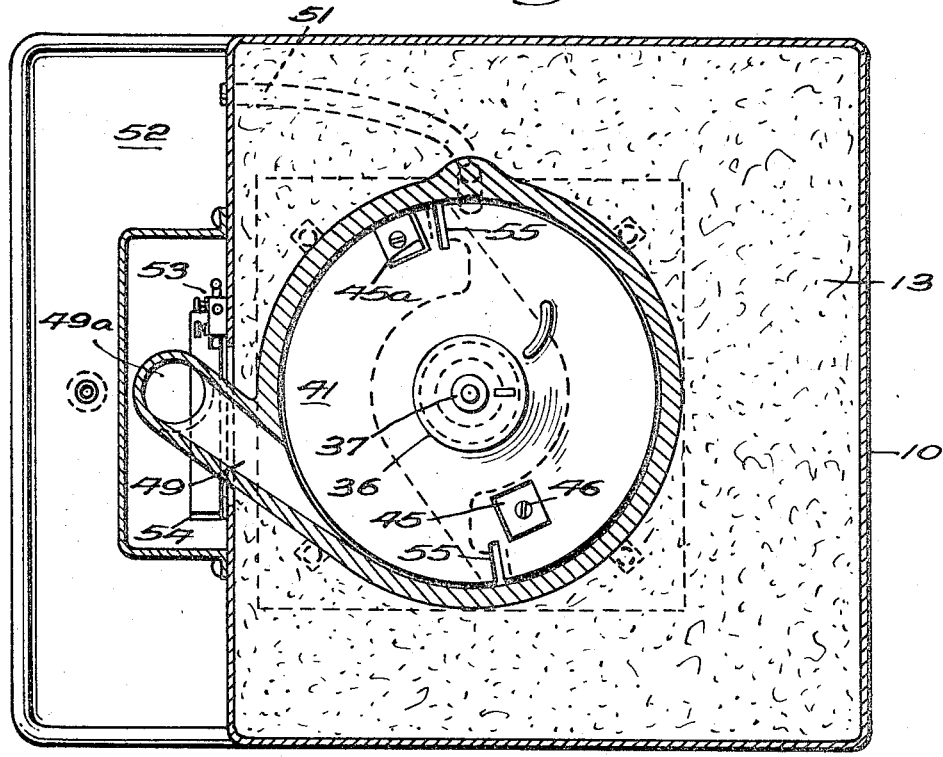
FIG. 3 is a view in transverse section taken on line 3—3 of FIG. 2.
Figure 4:
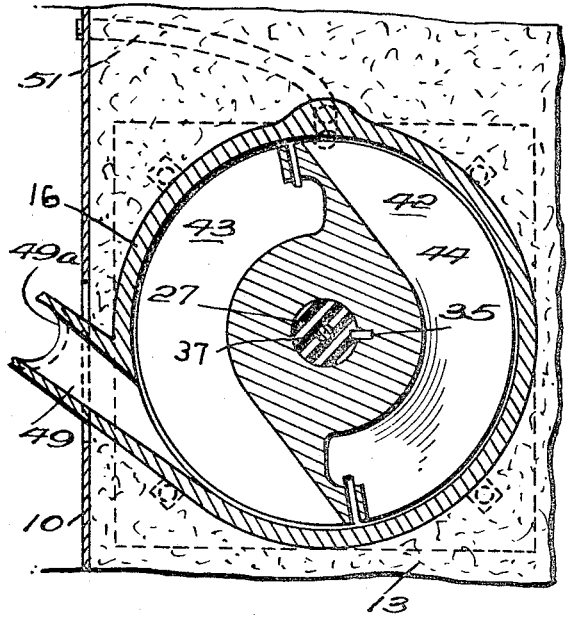
FIG. 4 is a view in transverse section taken on line 4—4 of FIG. 2.
Figure 5:
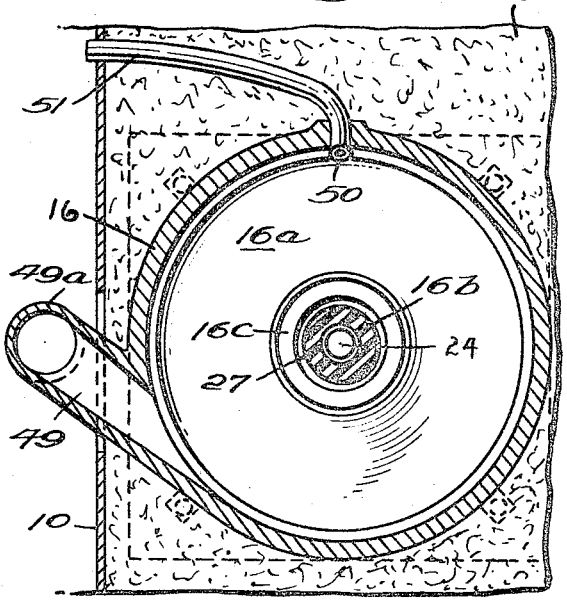
FIG. 5 is a view in transverse section taken on line 5—5 of FIG. 2.

With reference now to the drawings, the ice shaving machine is seen to be comprised of an outer housing 10 which may have any desired configuration. As illustrated, the housing has a generally rectangular configuration and is provided with a spaced wall, insulated lift-off top cover 11. An inner wall structure 12 shown in FIG. 2 is spaced from the outer housing 10 and the void between the two is filled with any suitable heat insulating material 13 so as to prevent loss of heat through the walls and melting of ice chunks stored in the machine when the latter is not is use. This insulating material 13 may be a glass wool or it can be of the cast foam type which is poured into the space between the two walls through openings, not shown, provided in the bottom wall of housing 10 and allowed to harden.

The inner wall structure 12 comprises an upper portion 14 of rectangular configuration which serves as a storage compartment for ice chunks and which is connected by a tapered transition wall 14a to a cylindrically configured wall 15 of sheet metal which together with a lower cylindrically configured cast wall part 16 establishes a rotor chamber 17 in which the chunks of ice are shaved. The chamber wall part 15 is provided with a fin 15a extending radially inward which serves to keep the charge of ice chunks in the chamber from rotating as the rotor rotates, thus bringing about a better shaving action.

The lower portion 18 of the inner wall structure is cast metal and defines a chamber part 19 for receiving an electric motor 20, the motor being mounted in the chamber by means of bolts 21 which pass through lugs 22 on the motor housing into a transverse wall part 23. The drive shaft 24 of the motor extends vertically upward through an opening 25 in the transverse wall 23 and is connected to the ice shaving rotor 26 located in the lower part of chamber 17 by means of a coupling member 27 made from any suitable heat insulating material such as a hard resinous plastic which can be machined.

The coupling member 27 includes an axially extending bore 28 for receiving the motor shaft 24, the latter being provided with a flat against which two longitudinally spaced Allen screws 29, 30 are seated, these screws being passed through corresponding transverse bores 31, 32 in the wall of the coupling member. To fasten the coupling member 27 to the motor shaft, the lower Allen screw 29 is run down to a point where it touches but does not bind against the flat on the rotor shaft. This makes it possible for the coupling member 27 to be placed in its proper position on the motor shaft from within the chamber 17. The upper Allen screw 30 is then run down to a binding position on the motor shaft thus to lock the coupling member securely to the shaft, it being noted that the upper screw 30 is readily accessible since it is located at a level above the floor of the chamber 17 established by a transverse wall part 16a provided with a central opening 16b for passage of the coupling member 27.

The upper part of the coupling member 27 terminates in a portion 33 of slightly reduced diameter which passes into a central bore 34 within rotor 26. Relative rotation between the coupling member and the rotor is prevented by use of a conventional key and slot connection between the two, the key being indicated at 35. In order to maintain the rotor 26 on the upper part 33 of the coupling member, it will be seen from FIG. 2 that a round end plate 36 covers the central part of rotor 26, the diameter of the plate 36 being slightly larger than the central bore 34, and that a crew 37 having a knurled head 37a to facilitate gripping by the fingers is passed through the center of end plate 36 and screwed into a threaded axial bore 38 provided in the upper end of the coupling member. To prevent any water from leaking between the under face of the end plate 36 and the adjacent upper face of the rotor, an O-ring 39 is provided to establish the necessary seal.

The ice shaving rotor 26 includes upper and lower plates 41, 42 spaced from each other and which form therebetween a pair of oppositely disposed chambers 43, 44 for receiving ice as it is shaved from the chunk ice by a pair of oppositely located knife blades 45 which are fastened in place by screws 46 to the upper plate 41 at an angle to the face of the plate, the leading, cutting edge 45a of each knife blade being positioned adjacent a slot 47 in the plate, as seen in FIG. 10, so that the ice as it is shaved from the ice chunks is forced into the chambers 43, 44, and due to the centrifugal force exerted thereon is passed outwardly through an opening 48 in the wall 16 located between the rotor plates 41, 42. Developed from this opening in the wall structure 16 is a discharge spout 49 arranged tangentially to the periphery of the rotor 26, it being noted that the flow cross section of the spout progressively increases in the direction of flow of the shaved ice, a feature which facilitates passage of the ice and minimizes the danger of clogging. The discharge end 49a of the spout is turned downwardly for delivery to any suitable container which is held beneath it.

The upper surface of the upper plate 41 is given a slight downward slope so as to provide a good drain-off characteristic for any water which might tend to accumulate on the latter, and a similar downward slope on the inside surface of the lower plate 42 serves two functions, one function being to develop the progressively increasing interior space between the two plates and the other being to provide a good drain-off for water.

The floor of the combined ice and rotor chamber 17 is provided with a drain for any water which may form by melting of the ice chunks. The drain structure will be seen clearly in FIGS. 7 and 8, the chamber floor being established by the transverse wall 16a which is cast with a slope towards one side at which a drain opening 50 is located.

One end of a flexible drain tube 51 is fitted into this opening, and the tube extends downwardly through the lower chamber 19 and thence outwardly through an opening in the chamber wall to a discharge point in a trough 52 which extends across the lower front portion of the overall housing structure.

Preferably, the lowermost point in the surface of transverse wall 16a is located not exactly at the drain opening 50 but rather is offset slightly from such opening so that any residual moisture which may remain on the floor surface will tend to collect at this low point rather than at the lip of the drain opening itself. The advantage of this is that any mineral scale which may tend to develop from residual moisture will form at the low point where it cannot do any harm rather than at the drain opening itself which could lead to clogging of the drain by a buildup of the scale. Water reaching the transverse wall 16a is prevented from flowing downward through the central opening 16b by means of an annular lip 16c formed at the central portion of the wall adjacent the opening 16b.

Operation of the machine is controlled by means of a switch mechanism 53 located on the front wall of the machine to one side of the discharge spout 49. The switch mechanism is actuated by a lever 54 having a top flange 54a which is adapted to be engaged by the rim portion of the container into which the shaved ice is to be delivered. As the rim of the container is inserted beneath the flange 54a and pushed upwardly, lever 54 will be caused to pivot in an upward direction until it strikes against the contact actuating member 53a of the switch thus causing the switch contacts to close and energize motor 20 which then causes the rotor 26 to turn at a relatively high speed and effect the ice shaving operation.

The switch arrangement is such that so long as the container is held under the spout, the motor will continue to run. As soon as the container has been filled with the desired amount of shaved ice, it is lowered, thus releasing lever 54 from the switch member 53a which results in opening of the switch contacts and deenergization of motor 20.

As previously explained, a principal objective of the present invention is to facilitate cleaning of the machine and a major structural feature related to this objective is that one is able to remove the rotor from its chamber in a very simple manner. All that is necessary is that the end retaining plate 36 be removed by removing screw 37 thus freeing the rotor 26 for removal in an upward direction from the coupling member 27. Since the diameter of the rotor is just slightly under that of the chamber 17, the rotor is provided with one, and preferably two radial slots 55 which extend inwardly from the periphery of the rotor in order to enable the rotor to pass the radially inwardly projecting fin 15a in chamber 17. If two slots 55 are provided, these are located at diametrically opposite points on the rotor so that in the event of a jam up in the machine the rotor will need to be turned by hand through only a half turn at the most in order to bring one of the slots 55 into alignment with fin 15a. The dual slot arrangement also provides better dynamic balancing of the rotor.

I claim:

1. In a machine for producing shaved ice, the combination comprising a vertically disposed housing structure including a thermally insulated upper chamber for receiving and storing ice in chunk form, a motor mounted within said housing structure below said ice chamber, said motor including a drive shaft extending vertically upward through a central opening in the bottom wall of said ice chamber, a coupling member made from a material having a low heat transfer coefficient secured at its lower portion to said motor drive shaft, an ice shaving rotor located in the lower part of said ice chamber and including upper and lower vertically spaced circular plates, said upper plate including at least one slot therein and an adjacently located knife for shaving and delivering the ice through said slot to a chambered portion established between said plates, said rotor further including a central bore receiving the upper end portion of said coupling member, removable means operable from within said ice chamber for retaining said rotor upon the upper end portion of said coupling member thereby enabling said rotor to be disconnected from said coupling member and removed upwardly through said ice chamber for cleaning and a discharge outlet for shaved ice located adjacent the periphery of said rotor intermediate said upper and lower plates.

2. A machine as defined in claim 1 for producing shaved ice wherein the distance between the confronting surfaces of the upper and lower plates of said rotor is progressively increased in a radially outward direction to facilitate ejection of shaved ice into said discharge outlet.

3. A machine as defined in claim 1 for producing shaved ice wherein the inner surface of the lower plate of said rotor has a downward slope in a radially outward direction.

4. A machine as defined in claim 1 for producing shaved ice wherein the top surface of said upper plate has a downward slope in a radially outward direction.

5. A machine as defined in claim 1 for producing shaved ice wherein said ice chamber includes a fin which projects radially inward from the chamber wall and said rotor includes at least one slot extending radially inward from the periphery thereof adapted to be brought into alignment with said fin to enable said rotor to be removed upwardly through said chamber.

6. A machine as defined in claim 1 for producing shaved ice wherein said means for retaining said rotor upon the upper end portion of said coupling member includes an end plate larger than the central bore in said rotor and screw means extending through said end plate into a threaded bore in the end of said coupling member.

7. A machine as defined in claim 6 for producing shaved ice and which further includes a sealing ring clamped between the underface of said end plate and the surface of said rotor.

8. A machine as defined in claim 1 for producing shaved ice wherein the bottom wall of said ice chamber slopes in the direction of a drain opening located at one side of said chamber, and the low point of said bottom wall is displaced from said drain opening.

9. A machine as defined in claim 1 for shaving ice wherein said discharge outlet for shaved ice includes a spout which progressively enlarges in the pass-through direction of the ice.